UNITED STATES PATENT OFFICE.

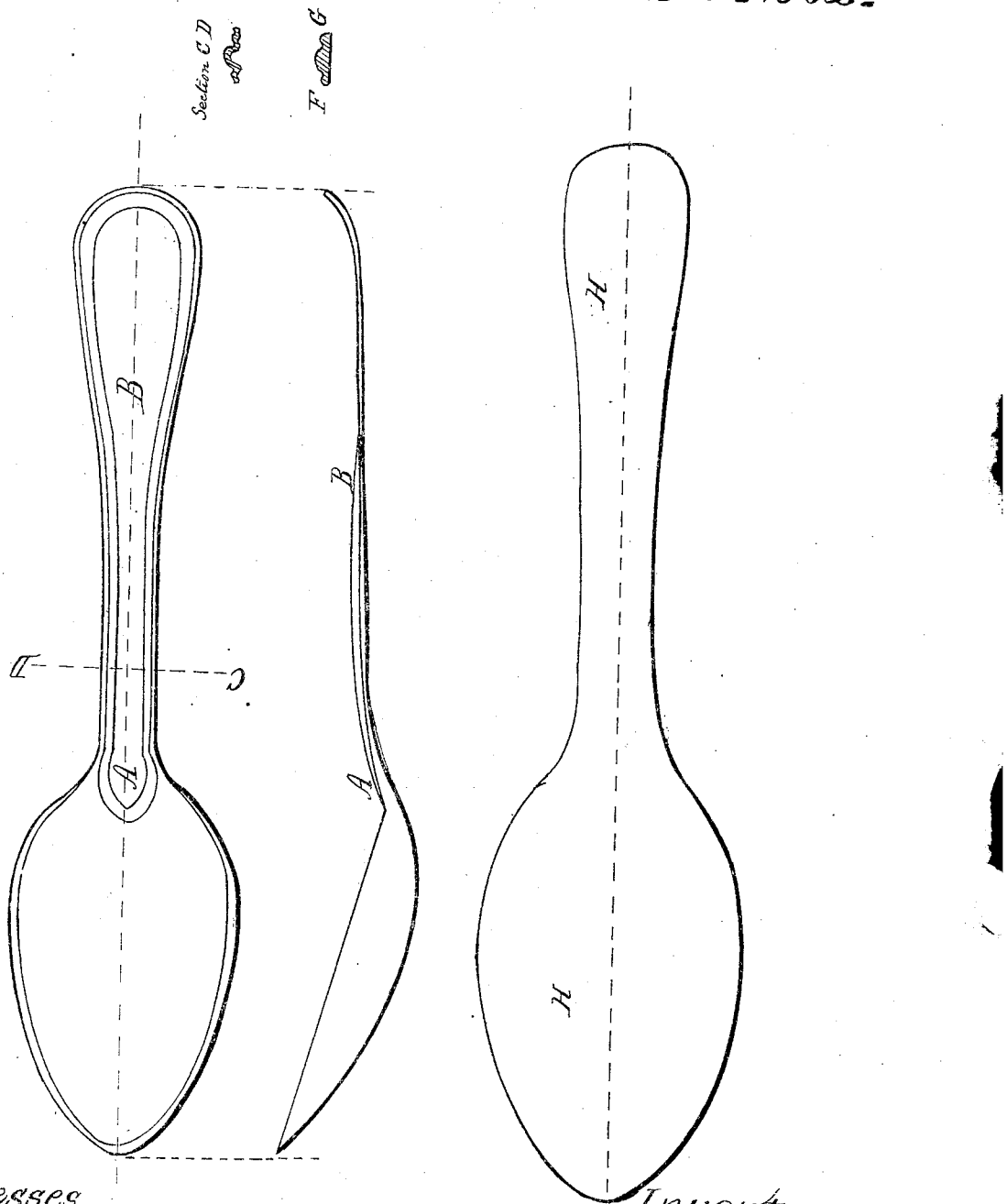

FLORIAN GROSJEAN, OF NEW YORK, N. Y.

IMPROVEMENT IN SHEET-METAL SPOONS.

Specification forming part of Letters Patent No. 34,252, dated January 28, 1862.

*To all whom it may concern:*

Be it known that I, FLORIAN GROSJEAN, of New York, in the county and State of New York, have invented a new and Improved Spoon made of Sheet Metal; and I do hereby declare that the following is a full and exact description thereof, reference being had to the accompanying drawings, and to the letters of reference marked thereon.

The nature of my invention consists in corrugating the handles of spoons stamped out of single pieces of sheet metal with a central corrugation, in combination with a bead around said corrugation, for the purpose of imparting the requisite strength and firmness to the narrow or weak part of the handles and at the same time of improving the shape and finish of the spoons for handling and good appearance.

In the accompanying drawings, H represents the blank piece of sheet metal of which the spoon is shaped. It is formed by suitable dies into the shape substantially shown in the first two figures, representing, respectively, a top and an edge view of the finished spoon. The bowl is of ordinary shape, and the small part of the handle—say from A to B—has a central corrugation, as indicated more clearly in the cross-section C D, while around this corrugation, near the edges of the handle, is formed another smaller corrugation or bead, as indicated clearly in the same cross-section and by lines in the first figure. This bead, for good appearance, may continue around the whole edge of the spoon-handle, as represented, and should extend far enough down into the bowl to insure the requisite strength where the handle and bowl unite. This is important, and the addition of the outer bead extending, as shown, down around the central corrugation into the bowl adds strength to that part which can hardly otherwise be attained. The outer bead also gives a better and handsomer form to the whole spoon. The improvement is obviously applicable to forks formed out of single pieces of sheet metal as well as to spoons. It enables spoons and forks of durability and good shape to be made in the cheapest manner known.

I do not claim mere beads or ornaments formed in the surfaces of spoon and fork handles made of rolled or cast metal, such, for instance, as indicated in the cross-section F G; but

What I claim as my invention, and desire to secure by Letters Patent, is—

Corrugating the handles of spoons or forks made of single pieces of sheet metal with the central corrugation and outer bead combined, substantially as and for the purpose herein specified.

F. GROSJEAN.

Witnesses:
V. BEAUMONT,
J. F. PERRIN.